(No Model.) 2 Sheets—Sheet 1.
T. B. SMITH.
MACHINE FOR THREADING WOOD SCREW BLANKS.

No. 531,226. Patented Dec. 18, 1894.

Witnesses:
Thos. A. Green
Robert Emmett

Inventor:
Thomas B. Smith.
By James L. Norris.
Atty.

THE NORRIS PETERS CO., PHOTO-LITHO., WASHINGTON, D. C.

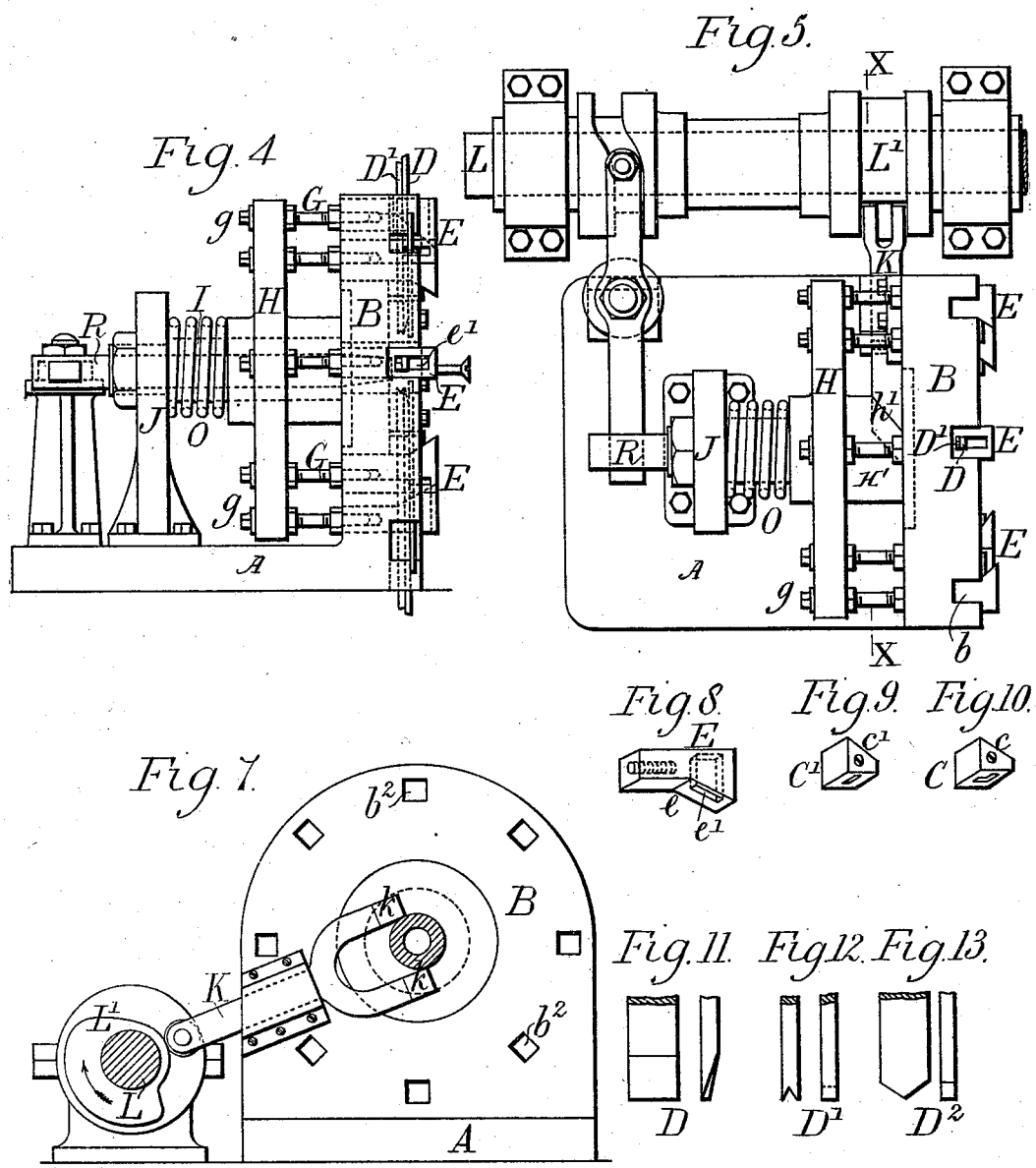

UNITED STATES PATENT OFFICE.

THOMAS B. SMITH, OF BIRMINGHAM, ENGLAND.

MACHINE FOR THREADING WOOD-SCREW BLANKS.

SPECIFICATION forming part of Letters Patent No. 531,226, dated December 18, 1894.

Application filed July 23, 1894. Serial No. 518,369. (No model.) Patented in England April 7, 1894, No. 6,962, and in Belgium July 20, 1894, No. 111,079.

*To all whom it may concern:*

Be it known that I, THOMAS BENJAMIN SMITH, a citizen of England, residing at 28 Westminster Road, Birchfields, Birmingham, in the county of Warwick, England, have invented certain new and useful Improvements in Machines for Threading Wood-Screw Blanks, (for which I have obtained Letters Patent in Great Britain, No. 6,962, dated April 7, 1894, and in Belgium, No. 111,079, dated July 20, 1894,) of which the following is a specification.

My invention relates to that class of wood screw cutting machines in which cutting tools are advanced in a radial direction toward a revolving and advancing screw blank so as to cut the thread thereon.

My improvements have for their object to enable the screws to be cut more rapidly and cleaner than heretofore while the machine is rendered of comparatively simple and compact construction and of very reliable action by dispensing in great measure with lever actions and pivoted joints.

According to my invention I mount the cutting and guiding tools in blocks capable of sliding radially to and fro in guides on a face plate the inward motion for operating on the screw blank being effected by forming inclines on the sliding blocks against which act inclined planes on bars that are caused by a wedge, cam or lever motion to move in a direction parallel or nearly so with the axis of the machine so that by such motion in one direction the inclined planes force the block with the cutters and guides inward against the action of springs so as to cut the thread on the screw, while when the bars move in the other direction so as to relieve the cutter blocks of their pressure, the blocks with the cutters and guides are forced outward into their original position by the said springs.

I will describe the construction and action of my improved machine with reference to the accompanying drawings, in which—

Figure 1:
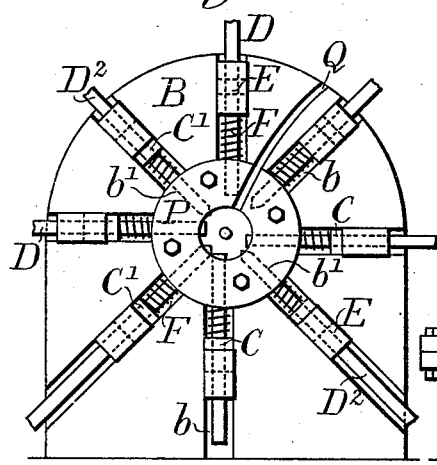
Figure 6:
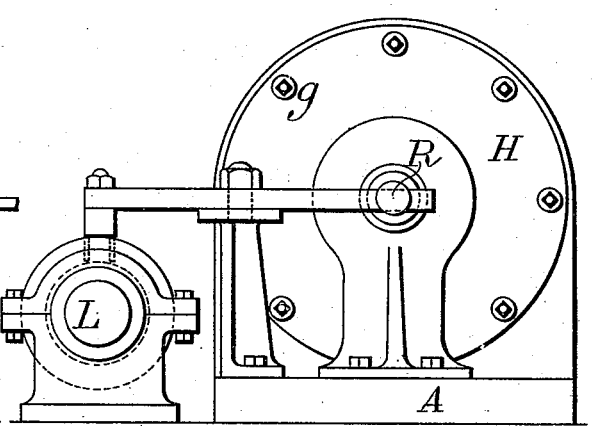
Figure 2:
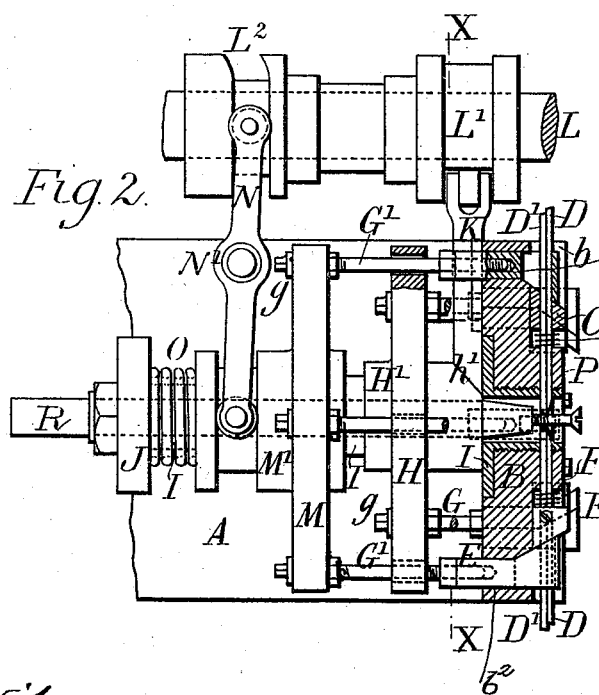
Figure 3:
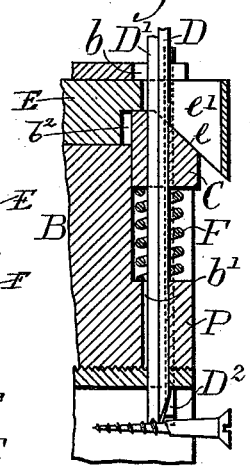

Figure 1 shows a front view and Fig. 2 a sectional plan of an arrangement in which the guides and cutters are each operated by a separate motion. Fig. 3 shows an enlarged part section of one of the bars with inclines and the cutter blocks. Figs. 4, 5 and 6 show respectively a side view, a plan and a back end view of another arrangement in which the cutters and guides are all operated by one and the same motion. Fig. 7 shows a cross section on line X X Figs. 2 and 5. Fig. 8 shows a separate view of one of the inclined plane bars. Figs. 9 and 10 show separate views respectively of the sliding blocks for the guides and the cutters. Fig. 11 shows the form of the cutter; Fig. 12, the trimmer, and Fig. 13 the guide.

The drawings only show so much of the complete machine as relates to my present invention, the other part of the machine, namely, that whereby the screw blanks are fed into the machine, and are held, advanced and rotated while the cutters cut the thread thereon, and are then withdrawn and removed from the machine, being of the well known construction heretofore employed in such machines and requiring no description.

Referring to Figs. 1, 2, 3 and 7 a base A has formed or fixed thereon a face plate or chuck B, in the front face of which are formed a series of radial grooves $b$ extending to within a certain distance of the center, the central portion of plate B being made with narrower grooves $b'$. Into the grooves $b$ are fitted sliding blocks C C' of which C carry the cutting and trimmings tools D D' which extend into the corresponding smaller grooves $b'$ while the blocks C' carry the guides $D^2$ which also enter the corresponding smaller grooves $b'$, the cutting and trimming tools and guides being secured in their blocks by setting screws. The outer faces of the blocks C C' are formed with inclines $c\,c'$ and against these bear inclines $e$ formed on sliding bars E which slide through correspondingly-formed holes $b^2$ formed in the face plate B, the blocks C C' being kept pressed against the inclines $e$ of the bars E by means of helical springs F bearing with one end against the blocks and with the other end against the end wall of the grooves $b'$. The rear ends of the bars E have threaded holes into which are screwed threaded stems G that are secured by collars $g\,g$ to a disk H, the stems G being rotatable in the disk by means of a spanner so as by screwing into or out of the bars E and by the aid of lock nuts to adjust these either nearer to or farther from the disk. The front ends of the bars E have slots e' for the tools D D' and guides D² to pass through.

The disk H is formed or fixed on a sleeve H' that can slide backward and forward upon a fixed tubular axis I which is secured to the face plate B and to a standard J at back. Part of the sleeve H' is cut away to form an inclined face h' against which bear inclines k formed on the forked end of an arm K sliding in a guide fixed to the back face of the plate B. The outer end of the arm has a roller bearing against a cam L' on a shaft L geared in any suitable manner to the driving shaft of the machine so as to make one revolution for every feed of a screw blank. The cam L' is so shaped as at one time to force forward the arm K and thereby to force backward the sleeve H', disk H and bars E carrying the guides, and at another time to allow the arm to recede as the sleeve and disk are forced forward again by the action of the springs acting on the blocks C'.

The screwed stems G' of those bars E that act on the cutter blocks C pass freely through holes in the disk H and are secured in a similar manner to a second disk M formed on a second sleeve M' that also slides upon the axis I and is formed with a neck with which engages the forked end of a lever N pivoted at N' whose other end engages with a second cam L² on the shaft L, so formed as to cause the lever N at one time to move the disk M and bars E backward and at another time to move them forward again, such forward motion being assisted by a spring O if necessary.

The cutters, trimmers and guides are held in their several grooves in the face plate B by a plate P bolted to the latter.

The action of the above described machine is as follows: The blocks C C' with the cutters, trimmers and guides being in the retracted or outward position shown at Fig. 1 and consequently the disks H M and bars E being in the forward position, a screw blank is introduced laterally into the axial line of the machine, being held by grippers in the well known manner for this purpose, a chase Q Fig. 1, being cut in the face of the face plate for this purpose, and in order to afford room for the passage of the blank between the top cutters and trimmers D D' and the contiguous guide D² to the right hand at Fig. 1, these have to be retracted to a greater extent than the other tools, as shown. In order to effect this the inclined planes e of the corresponding bars E have to be made of greater depth and with a greater incline than the others, as shown at the enlarged part section at Fig. 3, so as by their motion to produce a greater travel of the corresponding blocks C and C'. The screw blank being held in the central position by the grippers and advanced and rotated thereby, the rotation of the cam shaft L causes sliding arm K to force back the disk H, and the lever N to force back the disk M, thereby retracting the bars E and forcing the whole of the blocks C C' forward toward the axis of the machine. By this means the guides D², which are slightly in advance of the cutters D D', are made to hold the blank accurately in the central position at a point in advance of the cutters while the cutters D cut the helical thread on the blank, and the trimmers D' following on, trim the roughness of the screw thread produced. The machine shown at Figs. 1, 2, and 5 is more particularly intended for cutting short screws. With these, as the screw thread is cut nearly close up to the head, it is necessary that the guides D² should be made to recede from the blank when they approach the head thereof, in order to allow the cutters D D' to cut nearly up to the latter. To effect this, the cam L' is made of such a shape as to allow the arm K to recede when the blank has been advanced to the above mentioned point, thus allowing the springs F to force back the blocks C' which in their turn force forward the bars E and disk H. When the thread has been completely cut on the blank, the cam L² also allows the disk M and bars E to be moved forward by the spring O, thereby allowing the blocks C and cutters D D' to recede again, whereupon the screw is retracted by the grippers and is removed laterally through the chase. Within the tubular axis I is a sliding bar R operated by a cam on the shaft L (as shown at Figs. 4, 5 and 6,) and having a cutter at its front end, which cuts the point on the end of the screw while the thread is being cut on it. This cutter is of known construction and forms no part of my present invention and need therefore not be further described.

The construction of the machine shown at Figs. 4, 5 and 6 is more particularly adapted for cutting longer screws in which a considerable extent of the blank behind the head is left without a thread, so that it is not necessary in this case to withdraw the guides D² before the cutters are withdrawn. The second disk M, with its operating cam L², is consequently dispensed with, and the bars E for operating the guides, cutters and trimmers are all connected to the disk H which is operated by the arm K and cam L' in the same manner as above described. The construction and mode of action of this machine is otherwise precisely the same as that described with reference to Figs 1 and 2 and the several parts are indicated by the same letters of reference and need therefore not be further described.

It will be obvious that a greater or less number of guides and cutters than that shown may be employed and also that the arrangement may be variously modified in detail. Thus in the construction at Figs. 1 and 2, the front disk H may be made to operate the bars E for the cutter blocks, as in Figs 4 and 5 and the rear disk M be made to operate the bars for the guide blocks; also, any other suitable known mechanisms may be employed for effecting the backward and forward motion of the disks H and M in the manner described in place of those shown.

Having thus described the nature of my invention and the best means I know for carrying the same into practical effect, I claim—

1. In a screw cutting machine, the combination with the fixed face plate B provided with radial grooves, of the tool carrying blocks C provided on their outer faces with inclines $c$ and having a sliding movement in the radial grooves of the fixed face plate, the bars E arranged to slide through said face plate in a direction approximately parallel with the axis of the machine and provided with inclines $e$ adapted to force the tool carrying blocks $c$ radially inward during a backward movement of said bars, the springs F to force the blocks and tools radially outward on the forward movement of the bars E, the screw stems G adjustably connected to the bars E, the disk H carrying said screw stems, and mechanism for moving said disk forward and backward, substantially as described.

2. In a screw cutting machine the combination with a face plate B of radially sliding blocks C holding the tools and having inclines $c$, bars E sliding through the face plate and having inclines $e$ adapted to force the blocks C and tools radially inward when the bars are moved in a backward direction, springs F adapted to force the blocks C and tools radially outward on the forward motion of the bars E, a disk H carrying screwed stems G adjustably connected to the bars E, a sliding sleeve H' forming part of disk H, and having inclined faces, and a sliding arm K with inclines operating against the inclines of the sleeve H' and an appliance for moving the said arm forward so as to force backward the sleeve H, substantially as described.

3. In a screw cutting machine the combination with a face plate B, of radially sliding blocks C, carrying the operating tools D D' $D^2$, and sliding in grooves in the face plate, bars E sliding through the face plate having inclines operating against inclines on the blocks C, and slots through which the tools D D' $D^2$ pass, screwed stems G screwing into threaded holes in the bars E and rotatably secured in a disk H, and means for imparting a to and fro motion to the said disk, substantially as described.

In testimony whereof I have signed my name to this specification, in the presence of two subscribing witnesses, this 11th day of July, A. D. 1894.

THOMAS B. SMITH.

Witnesses:
　JOHN A. DARBY,
　THOS. MEADOWCROFT.